United States Patent [19]
Giovanetti et al.

[11] Patent Number: 5,122,267
[45] Date of Patent: Jun. 16, 1992

[54] FOAM FRACTIONATION FILTER
[75] Inventors: Thomas A. Giovanetti; Thomas G. Hudson, both of Dallas, Tex.
[73] Assignee: Oceanic Systems, Inc., Garland, Tex.
[21] Appl. No.: 645,551
[22] Filed: Jan. 24, 1991
[51] Int. Cl.[5] .................. B01D 19/00; B01D 21/02
[52] U.S. Cl. ................... 210/188; 210/521; 210/532.1; 210/540
[58] Field of Search ............ 210/188, 218, 436, 472, 210/521, 538, 539, DIG. 5, 513, 532.1, 540

[56] References Cited

U.S. PATENT DOCUMENTS

| | | | |
|---|---|---|---|
| 3,721,069 | 3/1973 | Walker | 210/DIG. 5 |
| 3,844,743 | 10/1974 | Jones | 210/188 |
| 4,390,422 | 6/1983 | Mackrle et al. | 210/188 |
| 4,603,000 | 7/1986 | Casey | 210/188 |

FOREIGN PATENT DOCUMENTS

| | | | |
|---|---|---|---|
| 30201 | 10/1979 | European Pat. Off. | 210/188 |
| 455994 | 8/1913 | France | 210/188 |
| 52-28067 | 2/1977 | Japan | 210/188 |
| 7208503 | 12/1973 | Netherlands | 210/DIG. 5 |
| 617380 | 7/1978 | U.S.S.R. | 210/DIG. 5 |

Primary Examiner—Robert A. Dawson
Assistant Examiner—Wanda L. Millard
Attorney, Agent, or Firm—Ross, Howison, Clapp & Korn

[57] ABSTRACT

A chamber having side walls, a bottom wall and a top wall having an aperture includes a fluid inlet aperture and a fluid outlet aperture. The chamber includes a bottom baffle disposed within the chamber and adjacent to the bottom wall for dividing the chamber into first and second areas. The bottom baffle includes an aperture for providing a fluid communication path between the chamber first and second areas. A side baffle is disposed within the chamber and adjacent to the side wall containing the fluid outlet aperture. The baffle is disposed generally perpendicular to the bottom baffle for creating a fluid communication path from the chamber second area to the chamber fluid outlet aperture for discharging liquid free of particles of foreign matter from the chamber. Structure is provided for introducing a mixture of the liquid contaminated with particles of foreign matter and bubbles of gas into the chamber first area through the side wall fluid inlet aperture, such that the bubbles of gas in the mixture rise to the top of the chamber whereby the particles of foreign matter contaminating the liquid are caused to float to the top of the chamber by surface adhesion to the bubbles of gas for discharge through the top wall aperture.

15 Claims, 1 Drawing Sheet

FOAM FRACTIONATION FILTER

TECHNICAL FIELD OF THE INVENTION

This invention relates to filtration systems, and more particularly to a flotation filtration system for the removal of organic wastes from aquaria.

BACKGROUND OF THE INVENTION

Aeration and flotation of biomass containing liquids can play an important function in various areas of biotechnology. A specific example relates to the treatment of waste water from sea water aquaria. Protein containing material is constantly added, as feed, to the water of such aquaria, and can accumulate within the aquaria. Over a period of time, this protein material degrades through the action of microorganisms, and can lead to an accumulation of nitrate, which may be harmful to fish living within the aquaria.

Various types of filtration systems have been proposed which utilize activated carbon or resins for the removal of organic wastes from sea water. Such systems utilize air stones, air pumps and require constant air adjustment in operation.

A need has thus arisen for a filtration system that operates at a constant level of performance, requires little maintenance and which is effective for the removal of organic wastes from an aquarium.

SUMMARY OF THE INVENTION

In accordance with the present invention, a filter for liquid contaminated with particles of foreign matter is provided. The filter includes a chamber having side walls, a bottom wall and top wall having an aperture. A baffle is disposed within the chamber adjacent to the bottom wall for dividing the chamber into first and second areas. The baffle includes an aperture for providing a fluid communication path between the first and second chamber areas. Structure is provided for introducing a mixture of the liquid contaminated with particles of foreign matter and bubbles of gas into the first chamber area, such that the bubbles of gas and the mixture rise to the top of the chamber whereby the particles of foreign matter contaminating the liquid are caused to float to the top of the chamber by surface adhesion to the bubbles of gas for discharge through the top wall aperture. Structure is provided for discharging liquid free of particles of foreign matter from the second area of the chamber.

In accordance with another aspect of the present invention, a chamber having side walls, a bottom wall and an top wall having an aperture is provided. The chamber side wall includes a fluid inlet aperture and a fluid outlet aperture. The chamber includes a bottom baffle disposed within the chamber and adjacent to the bottom wall of dividing the chamber into first and second areas. The bottom baffle includes an aperture for providing a fluid communication path between the chamber first and second areas. A side baffle is disposed within the chamber and adjacent to the side wall containing the fluid outlet aperture. The side baffle is disposed generally perpendicular to the bottom baffle for creating a fluid communication path from the chamber second area to the chamber fluid outlet aperture for discharging liquid free of particles of foreign matter from the chamber. Structure is provided for introducing a mixture of the liquid contaminated with particles of foreign matter and bubbles of gas into the chamber first area through the side wall fluid inlet aperture, such that the bubbles of gas in the mixture rise to the top of the chamber whereby the particles of foreign matter contaminating the liquid are caused to float to the top of the chamber by surface adhesion to the bubbles of gas for discharge through the top wall aperture.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
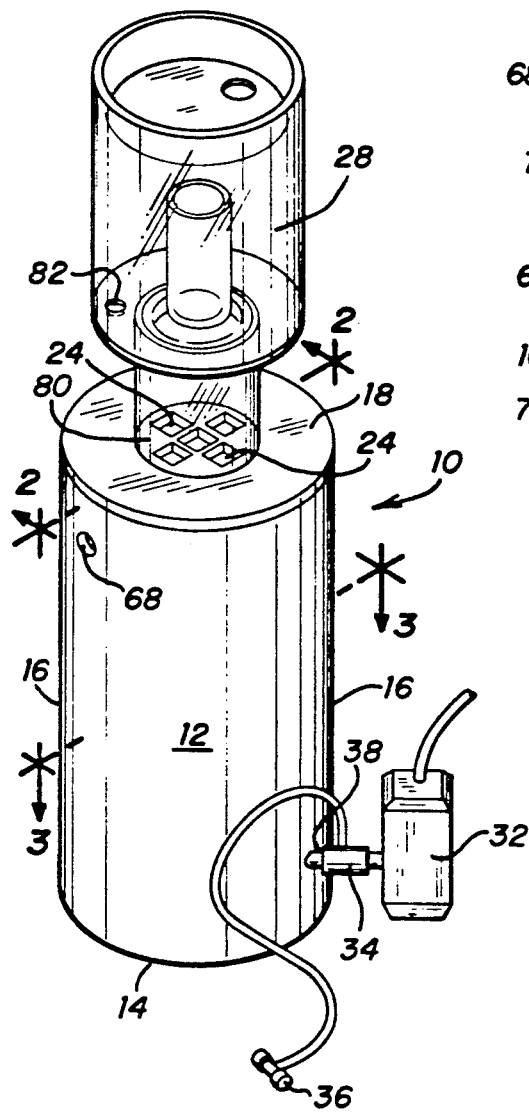
FIG. 1 is a perspective view of the present filtration system.
Figure 2:
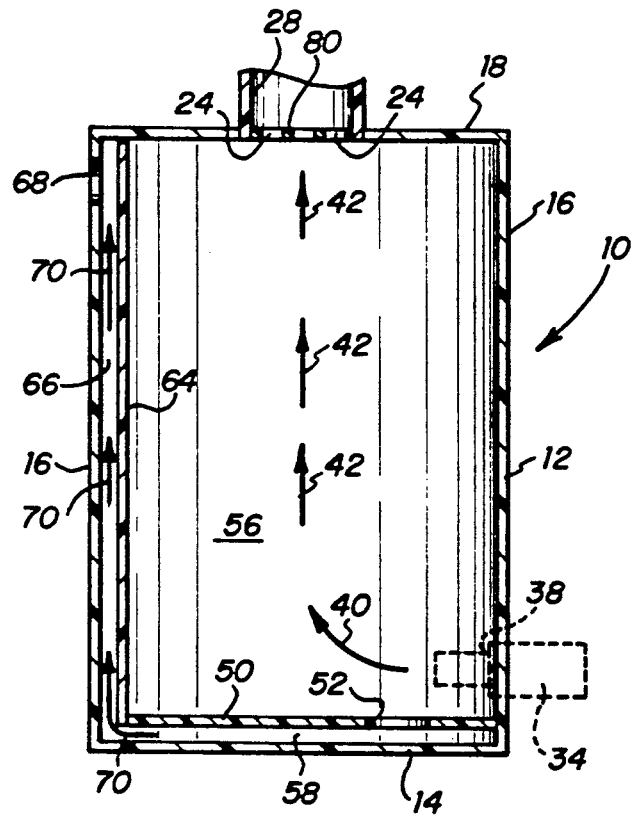
FIG. 2 is a cross-sectional view of the chamber of the present filtration system taken generally along section lines 2—2 of FIG. 1.
Figure 3:
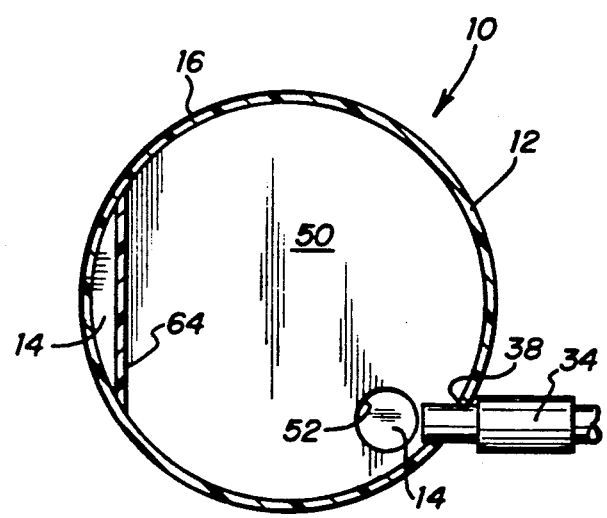
FIG. 3 is a cross-sectional view of the chamber of the present filtration system taken generally along sectional lines 3—3 of the FIG. 1.

Referring simultaneously to FIGS. 1, 2 and 3, the present filtration system is illustrated, and is generally identified by the numeral 10. Filtration system 10 may be utilized for example, for the filtration of organic wastes from aquaria, but is not limited to such use, it being understood that the present filtration system can be utilized for filtering any type of particles of foreign matter from liquid through foam fractionization and flotation. Filtration system 10 includes a cylindrical chamber 12 having a bottom wall 14, side wall 16, and a top wall 18. Top wall 18 includes a plurality of apertures 24. Disposed above top wall 18 of chamber 12 is a collection cup 28 which operates to collect organic wastes filtered through operation of the present filtration system 10.

Chamber 12 is partially immersed in a reservoir through which liquid from the aquarium is continuously circulated. Liquid containing the organic wastes from the reservoir is withdrawn from the aquarium and injected into chamber 12 utilizing a submersible pump 32. As liquid is pushed by pump 32 through a venturi valve 34, air is supplied to venturi valve 34 through a needle air valve 36. The mixture of air and contaminated liquid is introduced into chamber 12 via an aperture 38 contained within side wall 16 of chamber 12. The mixture of air and contaminated liquid circulates upwardly within chamber 12. Dissolved organic substances attach themselves to the surfaces of air bubbles, which flow upwardly within chamber 12. The bubbles burst releasing the dissolved organic substances into collection cup 28. The air liquid mixture introduced into chamber 12 via aperture 38 is indicated by arrow 40, and the movement of the air bubbles through chamber 12 is illustrated by arrow 42.

Referring more specifically to FIGS. 2 and 3, disposed within chamber 12 and parallel to bottom wall 14, is a baffle 50 including an aperture 52. Baffle 50 partitions or divides chamber 12 into two areas 56 and 58. Area 56 lies above baffle 50 and defines an area of chamber 12 in which the bubbles of gas in the liquid rise to apertures 24 such that the organic wastes contaminating the liquid are caused to float to top wall 18 of chamber 12. Area 58 below baffle 50 communicates with area 56 above baffle 50 through aperture 52. Liquid within area 58 is free of organic waste since the air introduced via venturi valve 34 is caused to rise within chamber 12 through operation of venturi valve 34 and pump 32 to carry the waste upwardly to top wall 18.

Further disposed within chamber 12 is a baffle 64 which is disposed generally perpendicularly to baffle 50 and adjacent to side wall 16 of chamber 12. Baffle 64 creates an area 66 adjacent side wall 16 which is in fluid communication with area 58 below baffle 50. Filtered liquid flows through aperture 52 of baffle 50 through area 58 and through area 66 defined by baffle 64 to a discharge aperture 68 contained within side wall 16 of chamber 12. Discharge aperture 68 is disposed adjacent top wall 18 of chamber 12. The flow of filtered liquid is indicated in FIG. 2 by arrows 70. Baffle 64 functions to separate within chamber 12, liquid free from organic wastes from the air liquid mixture of liquid containing organic wastes.

Filtered liquid is pushed via head pressure within chamber 12 through areas 58 and 66 toward aperture 68. The filtered liquid is then returned to the aquarium either directly via aperture 68 where filter 10 is disposed directly within the aquarium or through tubing (not shown) where filtration system 10 is located external of the aquarium. Aperture 68 disposed adjacent top wall 18 of cylinder 12 allows the present filtration system 10 to function independent of the water level in the aquarium and allows the level of liquid within chamber 12 to be greater than the level of liquid within the aquarium so that the bubbles within the chamber 12 can transverse a longer distance in order to trap more organic wastes as the bubbles transverse through chamber 12 from aperture 38 to apertures 24.

A swirling action takes place within chamber 12 due to the presence of the air bubbles. Contact time between the liquid and air is maximized by this swirling effort. Flotation of the dissolved organic wastes through chamber 12: however, is hindered by this swirling action. Therefore, top wall 18 of chamber 12 includes a plurality of apertures 24 arranged in a grid pattern 80. Grid pattern 80 impedes the swirling of the air liquid mixture and causes the air bubbles to rise vertically into collection cup 28. Collection cup 28 includes a drain 82 for draining any liquid which enters collection cup 28 along with air bubbles.

It therefore can be seen that the present invention provides for a flotation filtration system in which dual paths for filtered and unfiltered liquid are provided through the use of a baffle system. The present filtration system requires minimal maintenance, operates at a consistent level of performance, and can be operated independently of other filter elements within an aquarium.

Whereas the present invention has been described with respect to specific embodiments thereof, it will be understood that various changes and modifications will be suggested to one skilled in the art and it is intended to encompass such changes and modifications as fall within the scope of the appended claims.

We claim:

1. A foam fractionation filter for liquid contaminated with particles of foreign matter whereby the particles are removed from the liquid through flotation, comprising;
   a chamber having side walls, a bottom wall and a top wall, said top wall containing an aperture;
   a bottom baffle disposed within said chamber and parallel to said bottom wall for dividing said chamber into first and second areas, said first area disposed above said bottom baffle and said second area disposed below said bottom baffle, said bottom baffle including an aperture for providing a fluid communication path between said first and second chamber areas;
   means disposed adjacent said bottom baffle aperture for introducing a mixture of the liquid contaminated with particles of foreign matter and bubbles of gas into said first area of said chamber, such that said first area is substantially filled with said mixture and the bubbles of gas in said mixture rise to said top wall aperture of said chamber whereby the particles of foreign matter contaminating the liquid are caused to float to said top wall of said chamber by the surface adhesion to said bubbles of gas within said first area; and
   means for discharging liquid free of particles of foreign matter from said second are of said chamber.

2. The filter of claim 1 wherein said means for discharging liquid from said second area of said chamber includes:
   a side baffle disposed adjacent said side wall of said chamber and disposed generally perpendicular to said bottom baffle, said side wall including a discharge aperture, and said side baffle crating a fluid communication path from said chamber second area to said side wall discharge aperture.

3. The filter of claim 2 wherein said discharge aperture is disposed adjacent said top wall of said chamber.

4. The filter of claim 1 wherein said chamber includes an aperture for receiving said mixture of liquid and bubbles of gas, said aperture being disposed above said bottom baffle and adjacent said bottom baffle aperture.

5. The filter of claim 1 and further including:
   means for collecting the foreign particles removed from said chamber.

6. The filter of claim 1 wherein said introducing means includes a venturi valve.

7. A foam fractionation filter for liquid contaminated with particles of foreign matter whereby the particles are removed from the liquid through flotation, comprising:
   a chamber having side walls, a bottom wall and a top wall;
   said chamber side walls including a fluid inlet aperture and a fluid outlet aperture;
   said chamber top wall including a foreign particle discharge aperture;
   a bottom baffle disposed within said chamber and parallel to said bottom wall for dividing said chamber into first and second areas, said first area disposed above said bottom baffle and said second are disposed below said bottom baffle, said bottom baffle including an aperture for providing a fluid communication path between said chamber first and second areas and disposed adjacent said fluid inlet aperture;
   a side baffle disposed within said chamber adjacent said side wall containing said fluid outlet aperture and being disposed generally perpendicularly to said bottom baffle for creating a fluid communication path from said chamber second are to said chamber fluid outlet aperture for discharging liquid free of particles of foreign matter from said chamber; and means for introducing a mixture of the liquid contaminated with particles of foreign matter and bubbles of gas into said chamber first area through said fluid inlet aperture, such that said first area is substantially filled with said mixture and the bubbles of gas in said mixture rise to said top wall aperture of said chamber whereby the particles of foreign matter contaminating the liquid are caused to float to said top wall of said chamber by the surface adhesion to said bubbles of gas within said first area for discharge from said chamber through said top wall discharge aperture.

8. The filter of claim 7 wherein said fluid inlet aperture is disposed in said chamber side wall adjacent said bottom baffle and adjacent said bottom baffle aperture, and said fluid outlet aperture is disposed in said chamber side wall adjacent said chamber top wall.

9. The filter of claim 7 wherein said chamber side wall is circular and said side baffle is linear.

10. The filter of claim 7 wherein said chamber further includes:
means for collecting the foreign particles from said top wall discharge aperture.

11. The filter of claim 10 wherein said chamber further includes means for decreasing the flow of fluid at said top wall of said chamber for allowing said bubbles of gas to enter said collecting means.

12. A foam fractionation filter for liquid contaminated with particles of foreign matter whereby the particles are removed from the liquid through flotation, comprising:
a circular chamber having curvilinear side wall, a bottom wall and a top wall;
said circular chamber curvilinear side walls including a fluid inlet aperture and a spaced apart fluid outlet aperture;
said chamber top wall including a foreign particle discharge aperture;
a bottom baffle disposed within said circular chamber and parallel to said bottom wall for dividing said circular chamber into first and second areas, said first area disposed above said bottom baffle and said second area disposed below said bottom baffle, said bottom baffle including an aperture for providing a fluid communication path between said circular chamber first and second areas and disposed adjacent said fluid inlet aperture;
a linear side baffle disposed within said circular chamber adjacent said curvilinear side wall containing said fluid outlet aperture and being disposed generally perpendicularly to said bottom baffle for crating a third are within said circular chamber and being in fluid communication with said second are for crating a fluid communication path from said chamber second area to said circular chamber fluid outlet aperture through said third area for discharging liquid free of particles of foreign matter from said circular chamber; and
means for introducing a mixture of the liquid contaminated with particles of foreign matter and bubbles of gas into said circular chamber first area through said fluid inlet aperture, such that said first area is substantially filled with said mixture and the bubbles of gas in said mixture rise to said top wall aperture of said circular chamber whereby the particles of foreign matter contaminating the liquid are caused to float to said top wall of said circular chamber by the surface adhesion to said bubbles of gas within said first area for discharge from said circular chamber through said top wall discharge aperture.

13. The filter of claim 12 wherein said fluid inlet aperture is disposed in said circular chamber side wall adjacent said bottom baffle and said fluid outlet aperture is disposed in said circular chamber side wall adjacent said circular chamber top wall.

14. The filter of claim 13 wherein said circular chamber further includes means for collecting the foreign particles from said circular chamber and means for reducing the flow of fluid at said top wall of said circular chamber for allowing said bubbles of gas to enter said collecting means.

15. The filter of claim 14 wherein said introducing means includes a venturi valve.

* * * * *

UNITED STATES PATENT AND TRADEMARK OFFICE
CERTIFICATE OF CORRECTION

PATENT NO. : 5,122,267
DATED : June 16, 1992
INVENTOR(S) : Thomas A. Giovanetti and Thomas G. Hudson It is certified that error appears in the above-identified patent and that said Letters Patent is hereby corrected as shown below:

```
Column 4, Line 21, delete "are" and substitute "area";
Column 4, Line 28, delete "crating" and substitute "creating;
Column 4, Line 55, delete "are" and substitute "area";
Column 4, Line 65, delete "are" and substitute "area";
Column 6, Line 8, delete "crat-" and substitute "creat-";
Column 6, Line 9, delete "are" and substitute "area"; and
Column 6, Line 10, delete "are" and substitute "area".
Column 6, Line 11, delete "crating" and substitute
--creating--
```

Signed and Sealed this

Third Day of August, 1993

Attest:

MICHAEL K. KIRK

Attesting Officer

Acting Commissioner of Patents and Trademarks